United States Patent [19]
Hara et al.

[11] Patent Number: 6,023,974
[45] Date of Patent: Feb. 15, 2000

[54] ANGULAR VELOCITY SENSOR DEVICE

[75] Inventors: Takafumi Hara; Masaaki Taruya, both of Tokyo, Japan

[73] Assignee: Mitsubishi Denki Kabushiki Kaisha, Tokyo, Japan

[21] Appl. No.: 08/935,085

[22] Filed: Sep. 26, 1997

[30] Foreign Application Priority Data

Mar. 5, 1997 [JP] Japan ................................. 9-050592

[51] Int. Cl.$^7$ ........................................................ G01P 9/00
[52] U.S. Cl. ..................................... 73/504.15; 73/504.16
[58] Field of Search ............................. 73/504.02, 504.12, 73/504.14, 504.15, 504.16

[56] References Cited

U.S. PATENT DOCUMENTS 5,198,663  3/1993  Ichikawa et al. ..................... 73/504.12

FOREIGN PATENT DOCUMENTS 5-322579  12/1993  Japan .
6-123631   5/1994  Japan .

*Primary Examiner*—Hezron Williams
*Assistant Examiner*—Richard A. Moller
*Attorney, Agent, or Firm*—Sughrue, Mion, Zinn, Macpeak & Seas, PLLC

[57] ABSTRACT

An angular velocity sensor device that is produced in a simplified manufacturing process and at a reduced manufacturing cost. The angular velocity sensor device includes a first beam which extends along the surface of the substrate and to which a vibration driving source imparts a vibration in an X-axis direction along the surface of the substrate, and a second beam which follows an elliptical trajectory along the surface of the substrate in response to the resultant force of the force in the X-axis direction and a Coriolis force acting in an Y-axis direction perpendicular to the X-axis direction along the surface of the substrate.

10 Claims, 9 Drawing Sheets

FIG. 14
PRIOR ART
FIG. 14(a)
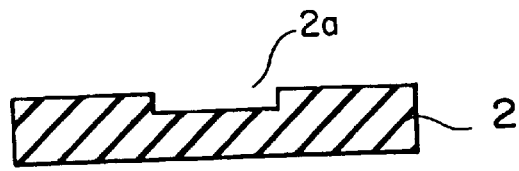
FIG. 14(b)
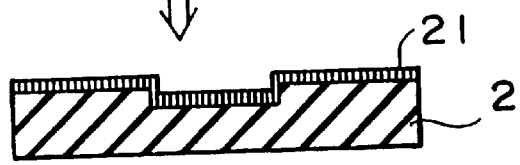
FIG. 14(c)
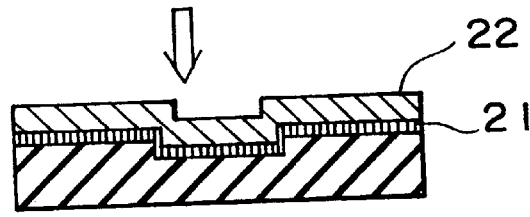
FIG. 14(d)
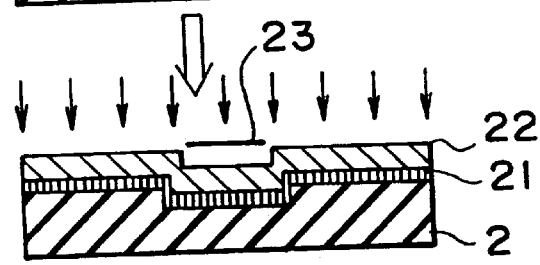
FIG. 14(e)
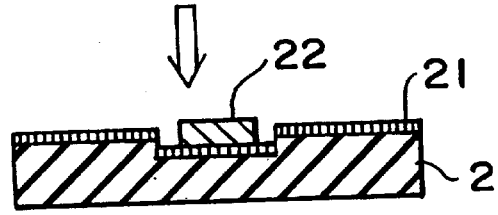
FIG. 14(f)
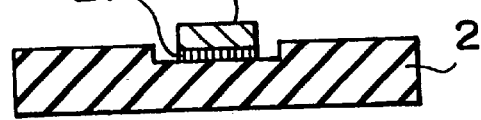
FIG. 14(g)
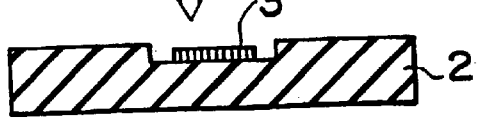

ANGULAR VELOCITY SENSOR DEVICE

BACKGROUND OF THE INVENTION

1. Field of the Invention

The present invention relates to an angular velocity sensor device for sensing angular velocity for use in cars or other vehicles.

2. Description of the Related Art

FIG. 12 is a perspective view showing a conventional angular velocity sensor device, and FIG. 13 is a cross-sectional view of the device of FIG. 12 taken along a line XIII—XIII.

This angular velocity sensor device comprises a substrate 2 manufactured of an insulating material such as glass and having a rectangular recess 2a in cross section, and a Y-axis angular velocity sensing body 4 provided along the surface of the substrate 2 for sensing angular velocity around a Y axis as the axis of rotation along the surface of the substrate 2.

The Y-axis angular velocity sensing body 4 comprises a generally T-shaped vibrator 9 having a base 7 bonded onto the substrate 2 and a beam 8 that can be deflected and vibrated, first and second X-axis vibration detection electrodes 10 and 11 respectively arranged on both sides of and in parallel with the beam 8, and a Z-axis Coriolis force sensing electrode 3 formed in the recess 2a.

FIG. 14 shows the manufacturing process of the Z-axis Coriolis force sensing electrode 3 formed on the substrate 2, in which the recess 2a is made first by etching glass with hydrofluoric acid or the like as shown in FIG. 14(a). Then, Pt is deposited on the entire top surface of the substrate 2 through a sputtering technique, thereby forming electrode 21 (FIG. 14(b)). Next, resist 22 is applied onto the electrode 21 (FIG. 14(c)). The resist coating 22 is exposed to light under a predetermined mask 23 and developed to strip unwanted portions (FIG. 14(d) and FIG. 14(e)). Unwanted portions of the electrode 21 are removed by an ion beam (FIG. 14(f)), and finally the resist 22 is removed (FIG. 14(g)) to form the Z-axis Coriolis force sensing electrode 3.

The operation of the angular velocity sensor device will now be discussed. When the beam 8 is driven and excited by a source of vibration in the X axis, namely in the transverse direction across the beam 8 along the plane of the substrate 2, the beam 8 vibrates in a simple harmonic mode relative to the base 7. A first gap 13 between the beam 8 and the first X-axis vibration detection electrode 10 and a second gap 14 between the beam 8 and the second X-axis vibration detection electrode 11 vary in their magnitude, and the sensed capacitance of an X-axis vibration detection capacitor 70 composed of the beam 8 and the X-axis vibration detection electrodes 10, 11 changes. Based on the value of the capacitance, the device is regulated so that the beam 8 is put into a predetermined drive/excitement state.

When the sensed capacitance of the X-axis vibration detection capacitor 70 changes, the change in capacitance is monitored as a voltage value through a capacitance-voltage converter circuit. Since voltage change is correlated to capacitance change, and capacitance change in turn is correlated to displacement due to vibration, the displacement due to vibration may be regulated at a constant by regulating the voltage change at a constant. More particularly, control is made such that the amplitude of the voltage value obtained as an output is kept at a constant. In the method of regulating the amplitude of the voltage value to a constant, the waveform of the voltage is half-wave rectified or full-wave rectified, and integrated, and feedback control is made such that the integrated value is kept at a constant. In this way, the amplitude of vibration of the beam 8 is regulated at a predetermined value.

An angular velocity about a Y-axis direction as the axis of rotation, that is, about the longitudinal direction of the beam 8, is applied to the vibrator 9 while the beam 8 vibrates in a simple harmonic mode relative to the base 7 along the plane of the substrate 2, a Coriolis force develops in the Z-axis direction, namely in the direction perpendicular to the substrate 2. As a result, the resultant force from the Coriolis force acting in the Z axis and the driving force acting in the X axis displaces the beam 8 in an elliptical trajectory, and thus the magnitude of a third gap 15 between the beam 8 and the Z-axis Coriolis force sensing electrode 3 varies. This means that the sensed capacitance of a Z-axis Coriolis force sense capacitor 71 created by the beam 8 and the Z-axis Coriolis force sensing electrode 3 also varies. The change in capacitance is output as an output voltage by the capacitance-voltage converter circuit, and the corresponding output signal is fed to a computer unit, and thus the angular velocity about the Y axis, as the axis of rotation is sensed.

In such a conventional angular velocity sensor device, however, the Coriolis force acts in the direction perpendicular to the direction in which the beam 8 is driven, and to sense the position of the beam 8 displaced by Coriolis force, the magnitude of variation in the third gap 15 between the beam 8 and the Z-axis Coriolis force sensing electrode 3 is sensed as the capacitance value of the Z-axis Coriolis force sense capacitor 71. For this reason, the Z-axis Coriolis force sensing electrode 3, which is an element of the Z-axis Coriolis force sense capacitor 71, has to be fabricated in the recess 2a of the substrate 2 of a insulating material as shown in FIG. 14, requiring a complex manufacturing process that pushes up the manufacturing cost.

SUMMARY OF THE INVENTION

Accordingly, it is an object of the present invention to provide an angular velocity sensor device that is produced in a simplified manufacturing process and at a reduced manufacturing cost.

According to a first aspect of the present invention, the Z-axis angular velocity sensing body in the angular velocity sensor device comprises: a first beam which extends along the surface of a substrate and to which a vibration driving source imparts a vibration in an X-axis direction along the surface of the substrate, a second beam which follows an elliptical trajectory along the surface of the substrate in response to the resultant force from the force in the X-axis direction and a Coriolis force acting in an Y-axis direction perpendicular to the X-axis direction along the surface of the substrate, an X-axis vibration detection electrode forming a vibration detection capacitor together with the first beam and a Y-axis Coriolis force sensing electrode forming a Coriolis force sensing capacitor together with the second beam.

According to a second aspect of the present invention, the first beam, the second beam, the X-axis vibration detection electrode and the Y-axis Coriolis force sensing electrode are manufactured of the same material.

According to a third aspect of the present invention, the second beam is connected to the first beam at one end of the first beam.

According to a fourth aspect of the present invention, the second beam extends laterally from the first beam on both sides of the first beam, and the Y-axis Coriolis force sensing electrodes are respectively provided at opposite end portions of the second beam.

According to a fifth aspect of the present invention, a plurality of second beams extend laterally from the first beam on both sides of the first beam, and the Y-axis Coriolis force sensing electrodes are respectively provided at opposite end portions of each of the second beams.

According to a sixth aspect of the present invention, the first beam, the second beam, the X-axis vibration detection electrode and the Y-axis Coriolis force sensing electrode are manufactured of silicon.

According to a seventh aspect of the present invention, the X-axis vibration detection electrodes are respectively provided on both sides of the first beam.

According to an eighth aspect of the present invention, an X-axis angular velocity sensing body for sensing angular velocity about an X axis as the axis of rotation, and a Y-axis angular velocity sensing body for sensing angular velocity about a Y axis as the axis of rotation are disposed on the surface of the substrate on which the Z-axis angular velocity sensing body is disposed.

According to a ninth aspect of the present invention, the Z-axis angular velocity sensing body, an X-axis angular velocity sensing body for sensing angular velocity about an X axis as the axis of rotation, and a Y-axis angular velocity sensing body for sensing angular velocity about a Y axis as the axis of rotation are fabricated into a laminated structure.

According to a tenth aspect of the present invention, the Y-axis angular velocity sensing body comprises a vibrator which follows an elliptical trajectory in response to the resultant force from the driving force in the X-axis direction and the Coriolis force acting in the Z-axis direction, an X-axis vibration detection electrode forming the vibration detection capacitance together with the vibrator, and a Z-axis Coriolis force sensing electrode forming the Coriolis force sensing capacitor together with the vibrator; and the X-axis angular velocity sensing body comprising a second vibrator which follows an elliptical trajectory in response to the force resultant from the driving force in the Y-axis direction and the Coriolis force acting in the Z-axis direction, a Y-axis vibration detection electrode forming the vibration detection capacitance together with the second vibrator and a Z-axis Coriolis force sensing electrode forming the Coriolis force sensing capacitor together with the second vibrator.

BRIEF DESCRIPTION OF THE DRAWINGS

FIG. 14 shows a manufacturing process for a Z-axis Coriolis force sensing electrode on a substrate.

DESCRIPTION OF THE PREFERRED EMBODIMENTS

First Embodiment

Figure 1:
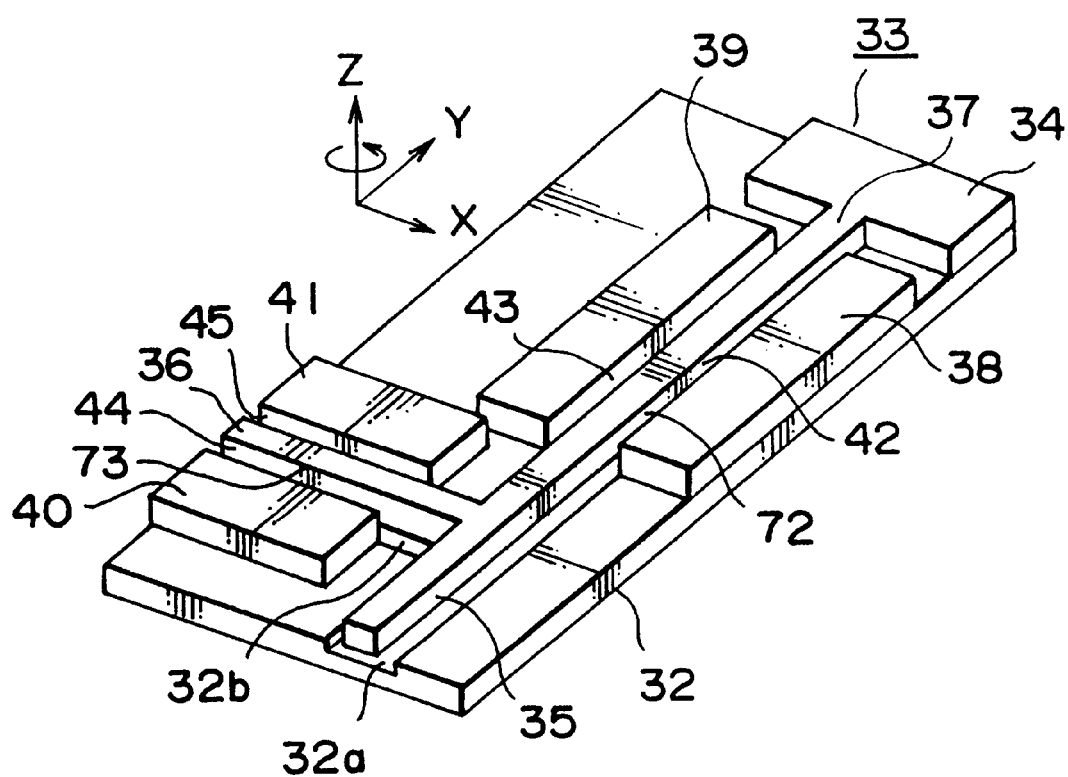
FIG. 1 is a perspective view showing the angular velocity sensor device according to a first embodiment of the present invention.
Figure 2:
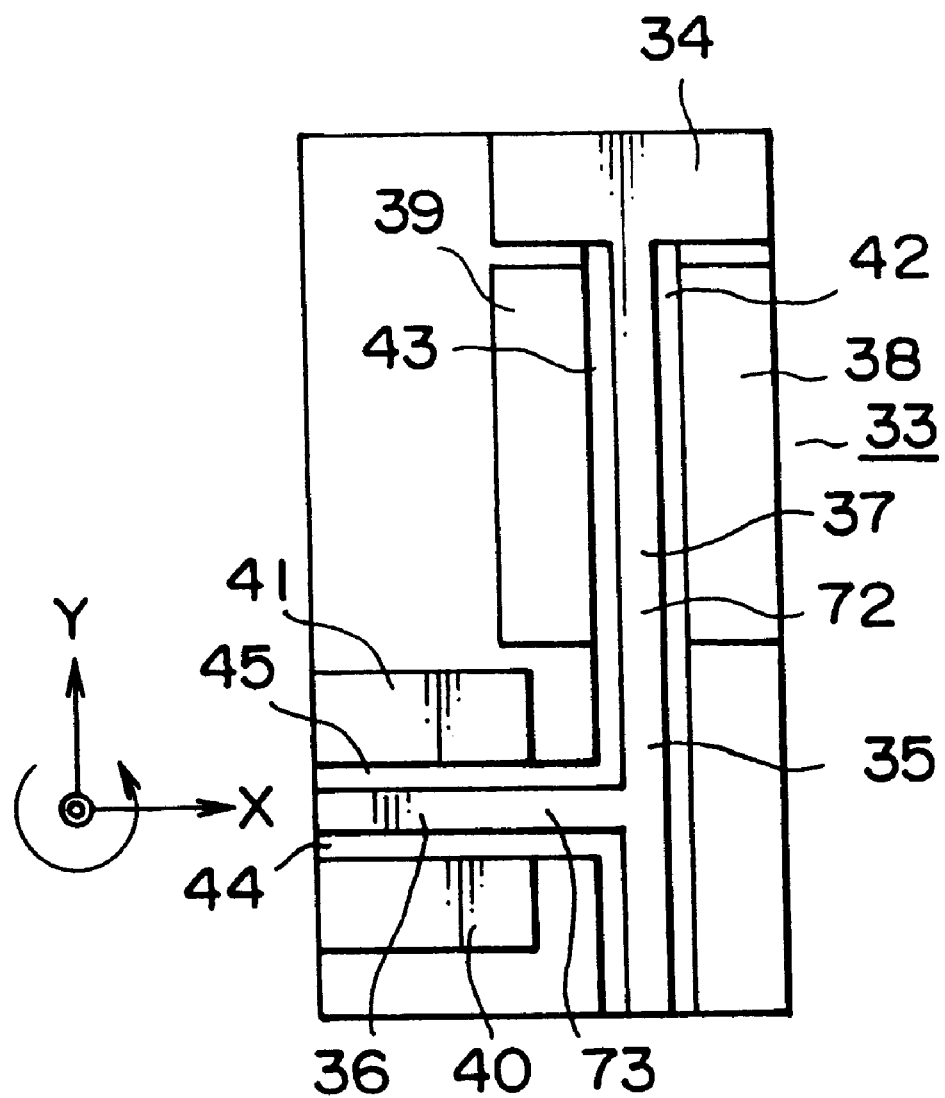
FIG. 2 is a plan view of the device of FIG. 1.

FIG. 1 is a perspective view showing the angular velocity sensor device of the first embodiment of the present invention, and FIG. 2 is a plan view of the device of FIG. 1.

The angular velocity sensor device comprises a substrate 32 manufactured of an insulating material such as glass and having a first recess 32a having a rectangular shape in cross section and a second recess 32b that extends in perpendicular to the first recess 32a, and a Z-axis angular velocity sensing body 33 attached to the substrate 32, for sensing angular velocity about a Z axis, as the axis of rotation, perpendicular to the substrate 32.

The Z-axis angular velocity sensing body 33 comprises a vibrator 37 with its base 34 bonded to the substrate 32, its first beam 35 which can be deflected, and its second beam 36, which can also be deflected and branches off from the first beam 35 at a right angle, a first X-axis vibration detection electrode 38 and a second X-axis vibration detection electrode 39, both arranged respectively on both sides of and in parallel with the first beam 35, and a first Y-axis Coriolis force sensing electrode 40 and a second Y-axis Coriolis force sensing electrode 41, both arranged respectively on both sides of and in parallel with the second beam 36.

The vibrator 37, X-axis vibration detection electrodes 38, 39, and Y-axis Coriolis force sensing electrodes 40, 41 are concurrently formed by subjecting a single silicon substrate to an etch process using masks of predetermined shapes.

The operation of the above angular velocity sensor device will now be discussed. When the first beam 35 is driven and excited in an X-axis direction that is the longitudinal direction of the second beam 36, the first beam 35 vibrates in a simple harmonic mode relative to its base 34. Variations take place in both the magnitude of the first gap 42 between the first beam 35 and the first X-axis vibration detection electrode 38, and the magnitude of the second gap 43 between the first beam 35 and the second X-axis vibration detection electrode 39, and the sensed capacitance of an X-axis vibration detection capacitor 72 formed by the first beam 35, X-axis vibration detection electrodes 38, 39 varies. Referring to the value of the capacitance, the first beam 35 is controlled to a predetermined drive/excitement state.

When the first beam 35 is reliably driven and displaced in the X-axis direction, namely in the longitudinal direction of the second beam 36, the second beam 36 is also displaced in its longitudinal direction. In this condition, when an angular velocity about a Z-axis direction as the axis of rotation, perpendicular to the substrate 32, is applied on the second beam 36, the second beam 36 is subject to a Coriolis force in a Y-axis direction, namely in the longitudinal direction of the first beam 35. As a result, in response to the resultant force from the Coriolis force and the driving force in the X-axis direction working on the second beam 36, the second beam 36 is displaced along the surface of the substrate 32, following an elliptical trajectory, and thus, variations are made in both the magnitude of a third gap 44 between the second beam 36 and the first Y-axis Coriolis force sensing electrode 40 and the magnitude of a fourth gap 45 between the second beam 36 and the second Y-axis Coriolis force sensing electrode 41. Therefore, the sensed capacitance of a Y-axis Coriolis force sensing capacitor 73 formed by the second beam 36 and the first and second Y-axis Coriolis force sensing electrodes 40, 41 varies. The output voltage in relation to the change in capacitance of the Y-axis Coriolis force sensing capacitor 73 is provided, and this output signal is fed to a computer unit where the angular velocity about the Z axis as the axis of rotation is thus determined.

In the angular velocity sensor device, X-axis vibration detection electrodes 38, 39, and Y-axis Coriolis force sensing electrodes 40, 41 are concurrently formed by subjecting a single silicon substrate to an etch process using masks of predetermined shapes at the same time the vibrator 37 is formed. Therefore, complex manufacturing process such as forming a Coriolis force sensing electrode in a recess of a substrate of an insulating material is not necessary. Although two X-axis vibration detection electrodes 38, 39 and two Y-axis Coriolis force sensing electrodes 40, 41 are employed herein, the use of a single X-axis vibration detection electrode and a single Y-axis Coriolis force sensing electrode is perfectly acceptable if sufficient sensitivity is gained.

Second Embodiment

Figure 3:
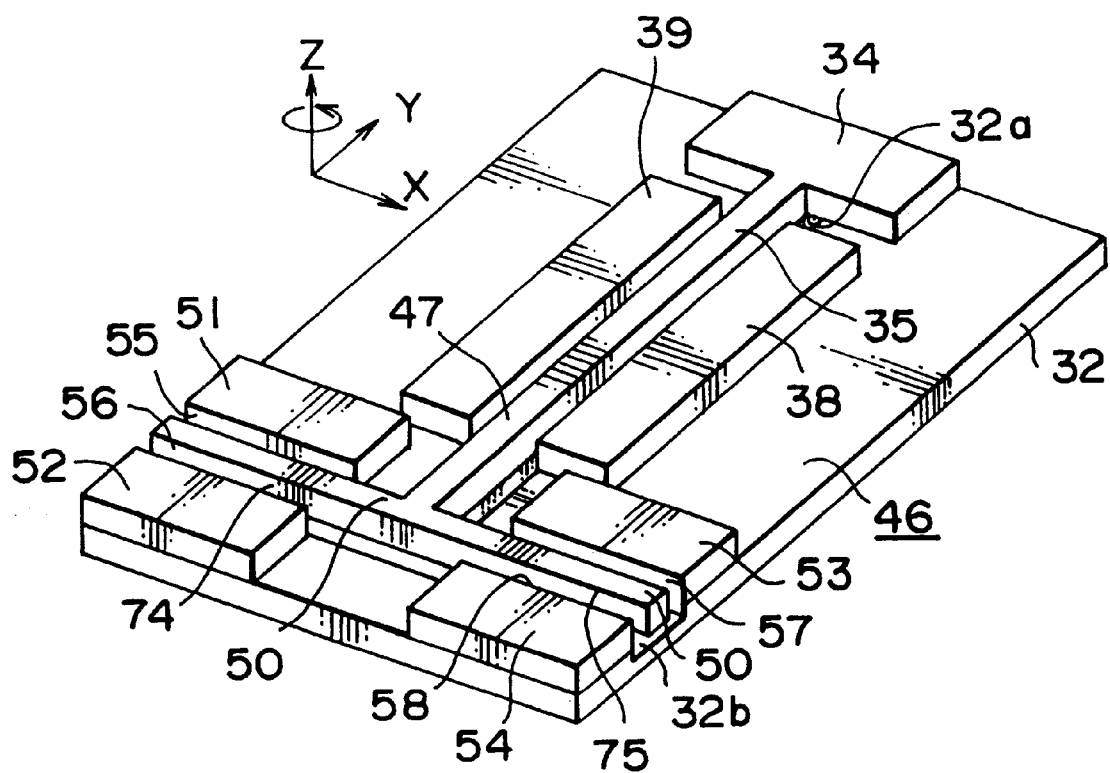
FIG. 3 is a perspective view showing the angular velocity sensor device according to a second embodiment of the present invention.
Figure 4:
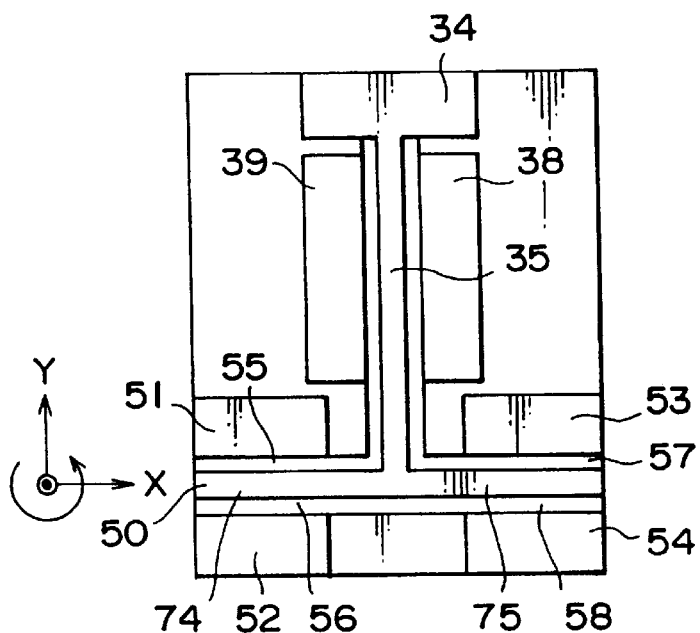
FIG. 4 is a plan view of the device of FIG. 3.

FIG. 3 is a perspective view showing the angular velocity sensor device according to a second embodiment of the present invention, and FIG. 4 is a plan view of the device of FIG. 3. Components identical to or equivalent to those described in connection the first embodiment are designated with the same reference numerals, and the description of them will not be repeated.

A Z-axis angular velocity sensing body 46 in the angular velocity sensor device comprises a vibrator 47 with its base 34 bonded to the substrate 32, its first beam 35, which can be deflected, and its second beam 50, which can also be deflected and branches off from the end of the first beam 35 at a right angle, a first X-axis vibration detection electrode 38 and a second X-axis vibration detection electrode 39, both running respectively on both side of and in parallel with the first beam 35, a first Y-axis Coriolis force sensing electrode 51 and a second Y-axis Coriolis force sensing electrode 52, both arranged respectively on both sides of and in parallel with one end portion of the second beam 50, and a third Y-axis Coriolis force sensing electrode 53 and a fourth Y-axis Coriolis force sensing electrode 54, both arranged respectively on both sides of and in parallel with the other end portion of the second beam 50.

In this embodiment, the second beam 50 is connected to the end of the first beam 35 where the first beam 35 exhibits greatest displacement, and thus the second beam 50 is greatly displaced by vibration in the X-axis direction along with displacement of the first beam 35. When an angular velocity about the X axis, as the axis of rotation, is applied to the substrate 32 with the second beam 50 vibrating greatly in the X-axis direction, a large Coriolis force works in the Y-axis direction on the second beam 50, and the resultant force from the Coriolis force and the force in the X-axis direction acting on the second beam 50 displaces the second beam 50 in an elliptical trajectory on the surface of the substrate 32. Therefore, variations take place in both the magnitude of a first gap 55 between the second beam 50 and the first Y-axis Coriolis force sensing electrode 51 and the magnitude of a second gap 56 between the second beam 50 and the second Y-axis Coriolis force sensing electrode 52; thus, the sensed capacitance of a first Y-axis Coriolis force sensing capacitor 74 formed by the second beam 50 and first and second Y-axis Coriolis force sensing electrodes 51, 52 varies. Furthermore, variations take place in both the magnitude of a third gap 57 between the second beam 50 and the third Y-axis Coriolis force sensing electrode 53 and the magnitude of a fourth gap 58 between the second beam 50 and the fourth Y-axis Coriolis force sensing electrode 54; thus, the sensed capacitance of a second Y-axis Coriolis force sensing capacitor 75 formed by the second beam 50 and third and fourth Y-axis Coriolis force sensing electrodes 53, 54 varies.

In this way, variation in capacitance due to the displacement of the second beam 50 is enlarged by summing the variation in the sensed capacitance of the first Y-axis Coriolis force sensing capacitor 74 and the variation in the sensed capacitance of the second Y-axis Coriolis force sensing capacitor 75, both of which arise from the displacement of the second beam 50, and an increased angular velocity sensor sensitivity results.

Angular velocity sensor sensitivity may be further increased by arranging a plurality of second beams from the first beam transversely, and Y-axis Coriolis force sensing electrodes on both sides of each end portion of the second beams.

Third Embodiment

Figure 5:
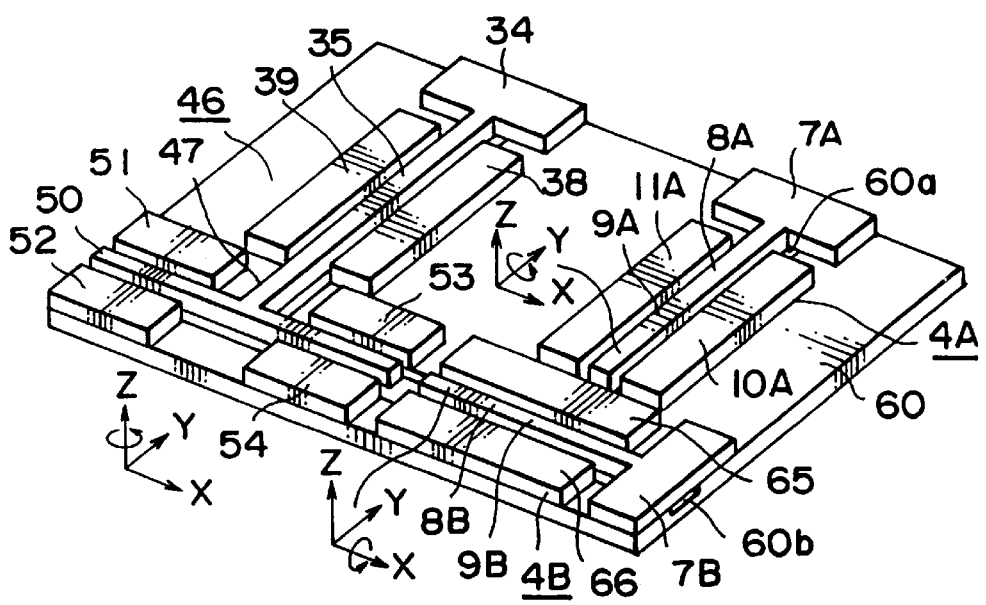
FIG. 5 is a perspective view showing the angular velocity sensor device according to a third embodiment of the present invention.
Figure 6:
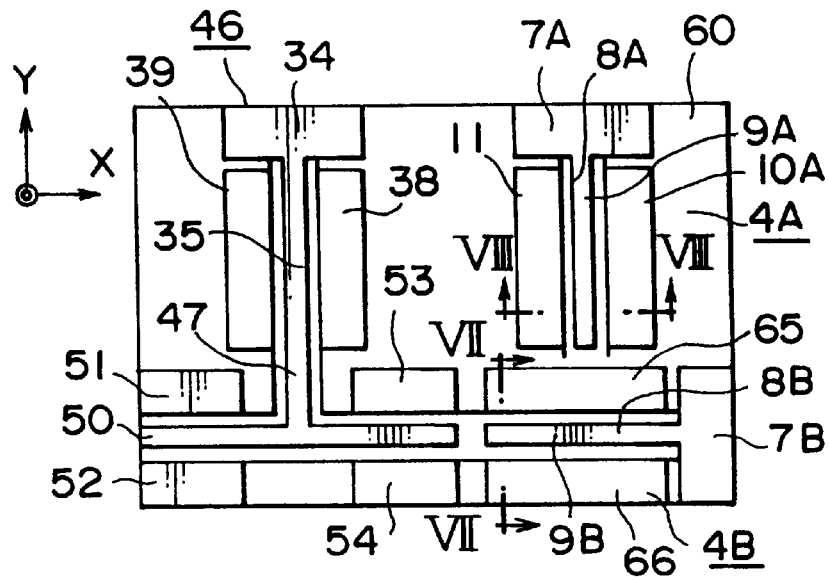
FIG. 6 is a plan view of the device of FIG. 5.
Figure 7:
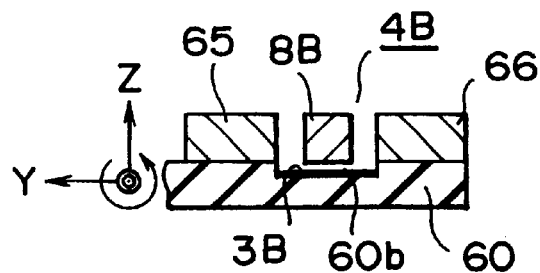
FIG. 7 is a sectional view taken along a line VII—VII in FIG. 6.
Figure 8:
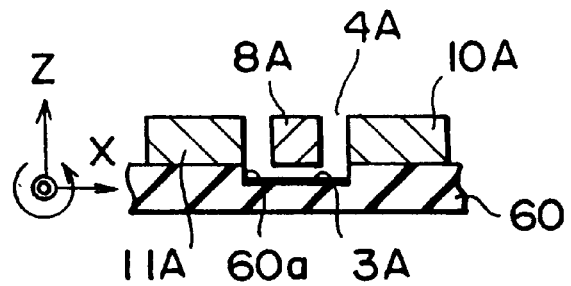
FIG. 8 is a sectional view taken along a line VIII—VIII in FIG. 6.

FIG. 5 is a perspective view showing the angular velocity sensor device according to a third embodiment of the present invention, FIG. 6 is a plan view of the device of FIG. 5, FIG. 7 is a sectional view taken along a line VII—VII in FIG. 6, and FIG. 8 is a sectional view taken along a line VIII—VIII in FIG. 6.

Figure 12:
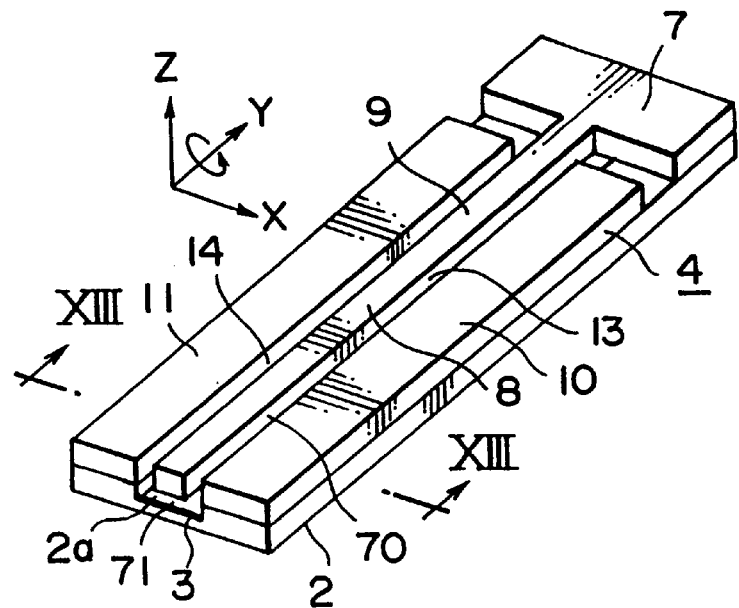
FIG. 12 is a perspective view of a conventional angular velocity sensor device.
Figure 13:
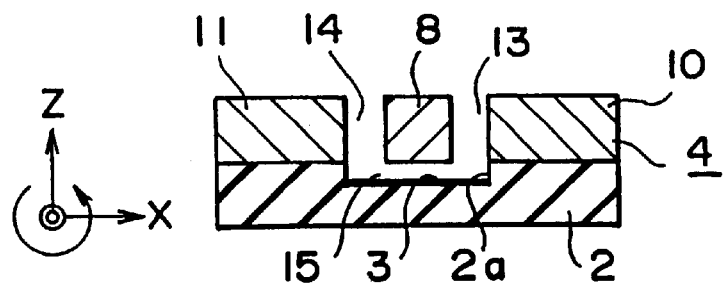
FIG. 13 is a sectional view taken along the line XIII—XIII in FIG. 12.

In this embodiment, a substrate 60 has disposed on its surface, a Y-axis angular velocity sensing body 4A constructed of elements identical to those of the conventional Y-axis angular velocity sensing body 4 shown in FIG. 12. The Y-axis angular velocity sensing body 4A comprises a basically T-shaped vibrator 9A having its base 7A bonded onto a substrate 60 and a beam 8A which can be deflected and vibrated, first and second X-axis vibration detection electrodes 10A and 11A respectively arranged on both sides of and in parallel with the beam 8A, and a Z-axis Coriolis force sensing electrode 3A formed in a recess 60a.

An X-axis angular velocity sensing body 4B comprises a generally T-shaped vibrator 9B having its base 7B bonded onto the substrate 60 and a beam 8B that can be deflected and vibrated, first and second Y-axis vibration detection electrodes 65 and 66 respectively arranged on both sides of and in parallel with the beam 8B, and a Z-axis Coriolis force sensing electrode 3B formed in a recess 60b.

The substrate 60 further has disposed on its surface the Z-axis angular velocity sensing body 46 described in connection the second embodiment; like components are identified with like reference numerals, and their description will not be repeated.

In this embodiment, the Y-axis angular velocity sensing body 4A senses angular velocity about the Y axis as the axis of rotation, the X-axis angular velocity sensing body 4B senses angular velocity about the X axis as the axis of rotation, the Z-axis angular velocity sensing body 46 senses angular velocity about the Z axis as the axis of rotation. Therefore, a single angular velocity sensor device senses three components of angular velocity, respectively those about the X, Y and Z axes as the axes of rotation.

Disposed on the substrate 60 are: X axis vibration detection electrodes 10A, 11A, vibrators 9A, 9B, Y-axis vibration detection electrodes 65, 66, vibrator 47 of the Z-axis angular velocity sensing body 46, first and second X-axis vibration detection electrodes 38, 39, first to fourth Y-axis Coriolis force sensing electrodes 51, 52, 53, and 54, and these elements are concurrently formed by subjecting a single silicon substrate to an etch process using masks of predetermined shapes.

Fourth Embodiment

Figure 9:
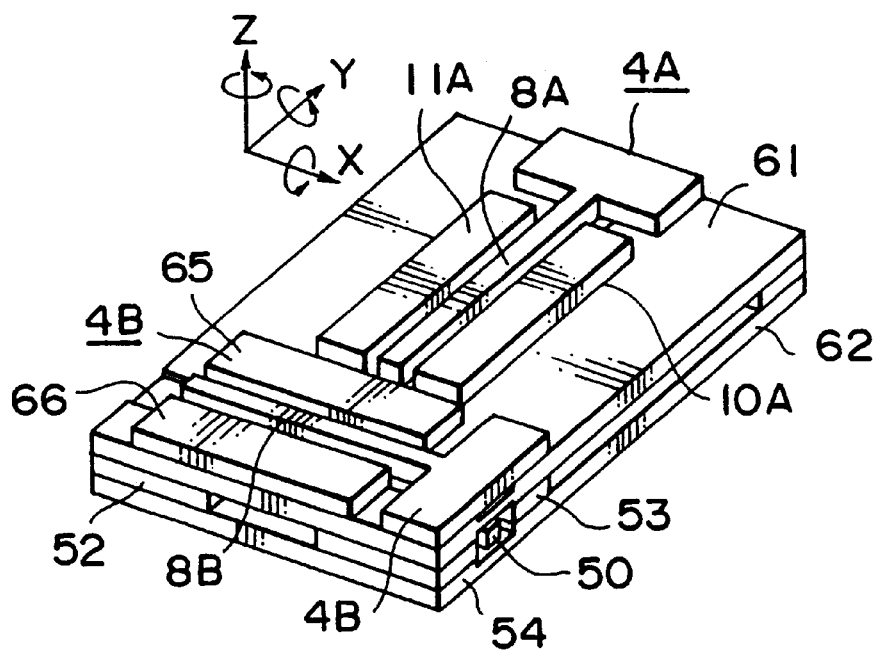
FIG. 9 is a perspective view showing the angular velocity sensor device according to a fourth embodiment of the present invention.
Figure 10:
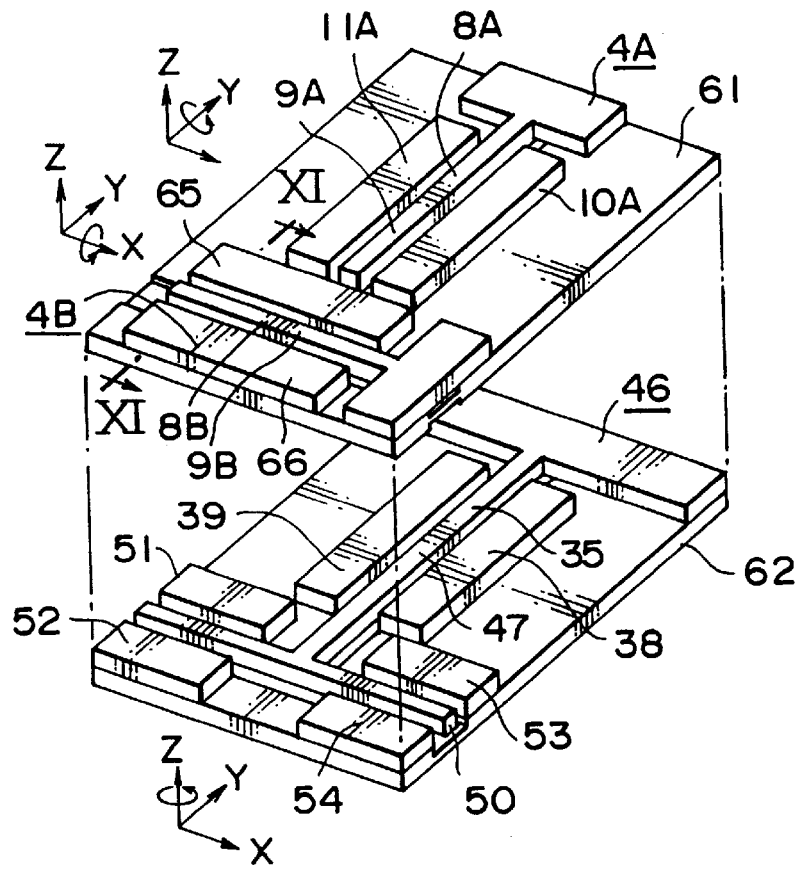
FIG. 10 is an exploded perspective view of the angular velocity sensor device of FIG. 9.
Figure 11:
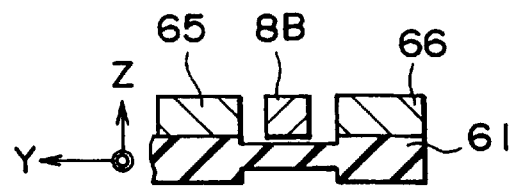
FIG. 11 is a sectional view taken along the line XI—XI in FIG.10.

FIG. 9 is a perspective view showing the angular velocity sensor device according to a fourth embodiment of the present invention, FIG. 10 is an exploded perspective view of the angular velocity sensor device of FIG. 9, and FIG. 11 is a sectional view taken along a line XI—XI in FIG.10.

In this embodiment, disposed on a first substrate 61 are a Y-axis angular velocity sensing body 4A in the Y axis and an X-axis angular velocity sensing body 4B in the X axis. The Y-axis angular velocity sensing body 4A and X-axis angular velocity sensing body 4B include elements identical to those in the third embodiment counterparts, and their description will not be repeated herein.

A second substrate 62 beneath the first substrate 61 has disposed its surface the Z-axis angular velocity sensing body 46 of the second embodiment.

Like the third embodiment, the fourth embodiment allows a single angular velocity sensor device to sense three pieces of angular velocity, those about the X, Y and Z axes, and furthermore, the Y-axis angular velocity sensing body 4A and X-axis angular velocity sensing body 4B and the Z-axis angular velocity sensing body 46 are laminated together, resulting in a compact design and add to increased flexibility in the mounting of the device.

The Y-axis angular velocity sensing body 4A, X-axis angular velocity sensing body 4B, and Z-axis angular velocity sensing body 46 may be separately disposed on different layers.

As described above, the Z-axis angular velocity sensing body in the angular velocity sensor device comprises the first beam which extends along the surface of the substrate and to which the vibration driving source imparts a vibration in the X-axis direction along the surface of the substrate, and the second beam which follows the elliptical trajectory along the surface of the substrate in response to the resultant force from the force in the X-axis direction and the Coriolis force acting in the Y-axis direction perpendicular to the X-axis direction along the surface of the substrate. The Coriolis force sensing electrode can thus be formed on the same layer as that of the first and second beams. A complex manufacturing process such as forming a Coriolis force sensing electrode in a recess of a substrate of an insulating material is avoided. Thus, the manufacturing process is simplified and the manufacturing cost is reduced.

When the first beam, second beam, X-axis vibration detection electrodes and the Y-axis Coriolis force sensing electrodes are manufactured of the same material, the first and second beams, X-axis vibration detection electrodes and Y-axis Coriolis force sensing electrodes are concurrently formed by subjecting a single silicon substrate to an etch process using masks of predetermined shapes, and the manufacturing process is thus simplified.

Moreover, when the second beam is connected to the first beam at one end of the first beam, where the driving displacement is greatest, the driving displacement of the second beam also becomes greatest. Therefore, a larger Coriolis force acts on the second beam, resulting in a larger displacement in the second beam and an increased angular velocity sensor sensitivity.

Moreover, when the second beam extends laterally from the first beam on both sides of the first beam, and each of the Y-axis Coriolis force sensing electrodes are respectively provided at opposite end portions of the second beam, it is possible to sense the sum of the variations due to the Criolis force at each end of the second beam; variations in the capacitance value of the Coriolis force sensing capacitors are increased, and angular velocity sensor sensitivity is increased as well.

Moreover, when a plurality of second beams extend laterally from the first beam on both sides of the first beam, and the Y-axis Coriolis force sensing electrodes are respectively provided at opposite end portions of each of the second beams, variations due to the Coriolis force are summed, variations in the capacitance value of the Coriolis force sensing capacitors are increased, and angular velocity sensor sensitivity is increased as well.

Moreover, when the X-axis vibration detection electrodes are respectively arranged on both sides of the first beam, the area of the first beam facing the X-axis vibration detection electrodes is increased, making a larger variation in the capacitance value of the vibration detection capacitors possible. The amplitude of the displacement of the first beam is reliably regulated at a predetermined value, and angular velocity sensor sensitivity is thus increased.

Moreover, when the X-axis angular velocity sensing body and Y-axis angular velocity sensing body are arranged on the surface of the same substrate as the Z-axis angular velocity sensing body, it is possible for a single angular velocity sensor device to sense the angular velocity about the X, Y and Z axes.

Moreover, it is possible to easily form the vibrator, Y-axis vibration detection electrodes, X-axis vibration detection electrodes and Y-axis Coriolis force sensing electrodes by subjecting, for example, a single silicon substrate to an etch process using masks of predetermined shapes.

Moreover, when the X-axis angular velocity sensing body, Y-axis angular velocity sensing body and Z-axis angular velocity sensing body are laminated together, the result is a compact design and an increased flexibility in the mounting of the device.

What is claimed is:

1. An angular velocity sensor device comprising a substrate manufactured of an insulating material, and a Z-axis angular velocity sensing body provided on the substrate, for sensing angular velocity about a Z axis, as the axis of rotation, in a direction perpendicular to the substrate;

the Z-axis angular velocity sensing body comprising:

a first beam which extends along the principal surface of the substrate with one end of the first beam fixed to the substrate wherein the driving force of a vibration driving source causes a vibration to be imparted to the first beam in an X-axis direction along the surface of the substrate;

a second beam which extends perpendicular to the first beam along the surface of the substrate and which follows an elliptical trajectory along the surface of the substrate in response to the resultant force from the force in the X-axis direction provided via the first beam and a Coriolis force acting in an Y-axis direction perpendicular to the X-axis direction along the surface of the substrate;

an X-axis vibration detection electrode provided opposite the first beam and together with the first beam forming a vibration detection capacitor; and a Y-axis Coriolis force sensing electrode provided opposite to the second beam and together with the second beam forming a Coriolis force sensing capacitor, wherein the capacitance of the vibration detection capacitor varies in response to the magnitude of the gap between the first beam and the X-axis vibration detection electrode, and the driving force of the vibration driving source is regulated by the value of the capacitance so as to put the first beam in a predetermined vibration state; and wherein the capacitance of the Coriolis force sensing capacitor varies in response to the magnitude of the gap between the second beam and the Y-axis Coriolis sensing electrode, and the angular velocity about the Z axis as the axis of rotation is sensed from the value of the capacitance of the Coriolis force sensing capacitor.

2. An angular velocity sensor device according to claim 1, wherein the first beam, the second beam, the X-axis vibration detection electrode and the Y-axis Coriolis force sensing electrode are manufactured of the same material.

3. An angular velocity sensor device according to claim 1, wherein the second beam is connected to the first beam at one end of the first beam.

4. An angular velocity sensor device according to claim 1, wherein the second beam extends laterally from the first beam on both sides of the first beam, and a Y-axis Coriolis force sensing electrode is respectively provided at both opposite end portions of the second beam.

5. An angular velocity sensor device according to claim 1, wherein a plurality of second beams extend laterally from the first beam on both sides of the first beam, and a Y-axis Coriolis force sensing electrode is respectively provided at opposite end portions of each of the second beams.

6. An angular velocity sensor device according to claim 1, wherein the first beam, the second beam, the X-axis vibration detection electrode and the Y-axis Coriolis force sensing electrode are manufactured of silicon.

7. An angular velocity sensor device according to claim 1, wherein a X-axis vibration detection electrode is respectively provided on both sides of the first beam.

8. An angular velocity sensor device according to claim 1, wherein an X-axis angular velocity sensing body for sensing angular velocity about an X axis as the axis of rotation, and a Y-axis angular velocity sensing body for sensing angular velocity about a Y axis as the axis of rotation are also disposed on the surface of the substrate on which the Z-axis angular velocity sensing body is disposed.

9. An angular velocity sensor device according to claim 1, wherein the Z-axis angular velocity sensing body, an X-axis angular velocity sensing body for sensing angular velocity about an X axis as the axis of rotation, and a Y-axis angular velocity sensing body for sensing angular velocity about a Y axis as the axis of rotation are fabricated in a laminated structure.

10. An angular velocity sensor device according to claim 8, wherein the Y-axis angular velocity sensing body comprises a vibrator fixed at one end to the substrate which follows an elliptical trajectory in response to the resultant force from the driving force in the X-axis direction provided by the vibration driving source and the Coriolis force acting in a Z-axis direction, an X-axis vibration detection electrode provided opposite the vibrator and together with the vibrator forming the vibration detection capacitor, and a Z-axis Coriolis force sensing electrode provided opposite the vibrator on the substrate and together with the vibrator forming the Coriolis force sensing capacitor; and the X-axis angular velocity sensing body comprising a second vibrator, fixed at one end to the substrate, which follows an elliptical trajectory in response to the resultant force from the driving force in the Y-axis direction provided by the vibration driving source and the Coriolis force acting in the Z-axis direction, a Y-axis vibration detection electrode provided opposite the second vibrator and together with the second vibrator forming the vibration detection capacitor, and a Z-axis Coriolis force sensing electrode provided opposite the second vibrator on the substrate and together with the second vibrator forming the Coriolis force sensing capacitor.

* * * * *